US010223649B2

(12) United States Patent

Cheng et al.

(10) Patent No.: US 10,223,649 B2

(45) Date of Patent: Mar. 5, 2019

(54) SYSTEM AND METHOD OF MULTI-OBJECTIVE OPTIMIZATION FOR TRANSPORTATION ARRANGEMENT

(71) Applicant: SAP SE, Walldorf (DE)

(72) Inventors: Yu Cheng, Shanghai (CN); Wen-Syan Li, Shanghai (CN)

(73) Assignee: SAP SE, Walldorf (DE)

( * ) Notice: Subject to any disclaimer, the term of this patent is extended or adjusted under 35 U.S.C. 154(b) by 643 days.

(21) Appl. No.: 14/884,773

(22) Filed: Oct. 16, 2015

(65) Prior Publication Data

US 2017/0109631 A1 Apr. 20, 2017

(51) Int. Cl.
*G06Q 10/04* (2012.01)

(52) U.S. Cl.
CPC .................................. *G06Q 10/047* (2013.01)

(58) Field of Classification Search
USPC ........................................................... 706/46
See application file for complete search history.

(56) References Cited

U.S. PATENT DOCUMENTS 6,112,126 A 8/2000 Hales et al.
7,464,009 B2 12/2008 Schwarzmann
8,195,496 B2 6/2012 Gottlieb et al.
8,775,397 B2 * 7/2014 Dong ................ G06F 17/30545 707/705
9,207,090 B2 * 12/2015 Cheng ................ G01C 21/3492
9,350,643 B2 * 5/2016 Wang .................... H04L 45/125
9,665,830 B2 * 5/2017 Cheng .................. G06N 99/005
9,792,334 B2 * 10/2017 Wang ................. G06K 9/00785
9,857,186 B2 * 1/2018 Zhou ..................... G01C 21/343
9,984,544 B2 * 5/2018 Wang ............... G08B 13/19645
10,068,186 B2 * 9/2018 Shi ........................ G06N 99/005
10,083,448 B2 * 9/2018 Cheng .................... G06Q 50/30
2004/0107110 A1 6/2004 Gottlieb et al.

(Continued)

OTHER PUBLICATIONS

ScienceDirect Elsevier Transportation Research Part C: Emerging Technologies vol. 7, Issue 4, Aug. 1999, pp. 167-185 Use of vehicle signature analysis and lexicographic optimization for vehicle reidentification on freeways Carlos Sun, Stephen G. Ritchie, Kevin Tsai, R. Jayakrishnan.*

(Continued)

*Primary Examiner* — Michael B Holmes

(74) *Attorney, Agent, or Firm* — Klarquist Sparkman, LLP

(57) ABSTRACT

A technology for multi-objective optimization is provided. In accordance with one aspect, historical data and real-time data of a network of interest are provided in an integrated database. User input containing a problem to be solved and user preference for solving the problem is received. An optimization function is identified for generating at least one solution to the problem. The optimization function is identified based on the user preference. In response to identifying a single objective optimization function, the optimization function is initiated from a single objective optimization function library. In response to identifying a multi-objective optimization function, the optimization function is initiated from a multi-objective optimization function library. The optimization function retrieves the historical and real-time data based on the user preference for solving the problem. A result comprising at least one solution to the problem is provided.

16 Claims, 5 Drawing Sheets

(56) References Cited

U.S. PATENT DOCUMENTS

| | | | | |
|---|---|---|---|---|
| 2008/0215512 | A1* | 9/2008 | Narzisi | G06N 3/126 706/13 |
| 2010/0325281 | A1* | 12/2010 | Li | G06F 17/30575 709/226 |
| 2013/0346380 | A1* | 12/2013 | Dong | G06F 17/30545 707/705 |
| 2014/0180958 | A1 | 6/2014 | Arunapuram et al. | |
| 2014/0279662 | A1* | 9/2014 | Wang | G01Q 10/0838 705/338 |
| 2015/0088417 | A1* | 3/2015 | Cheng | G01C 21/3492 701/465 |
| 2016/0306899 | A1* | 10/2016 | Amid | G06N 99/005 |

OTHER PUBLICATIONS

ScienceDirect Elsevire Waste Management vol. 31, Issue 12, Dec. 2011, pp. 2391-2405 Waste collection multi objective model with real time traceability data Maurizio Faccio, Alessandro Persona, Giorgia Zanin.*

ScienceDirect Elsevire European Journal of Operational Research vol. 198, Issue 2, Oct. 16, 2009, pp. 435-446 Production, Manufacturing and Logistics Multi-objective evacuation routing in transportation networks Alexander Stepanov, James MacGregor Smith.*

A Synthesis of emerging data collection technologiesand their impact on traffic management applicationsConstantinos Antoniou & Ramachandran Balakrishna & Hans N. Koutsopoulos Eur. Transp. Res. Rev. (2011) 3:pp. 139-148.*

Vesa Ojalehto, IND-NIMBUS Software for Multiobjective Optimization, Proceedings of the fith WSEAS International Conference on Simulation, Modelling and Optimization, Sep. 22-24, 2006, 654-659, Lisbon, Portugal.

IND-NIMBUS, Interactive Multiobjective Optimization System, Finland, http://ind-nimbus.it.jyu.fi/.

Abdullah Konak et al., Multi-objective optimization using genetic algorithms: A tutorial, Reliability Engineering and System Safety 91, 2005, 992-1007, Elsevier Ltd., Pennsylvania, USA.

* cited by examiner

SYSTEM AND METHOD OF MULTI-OBJECTIVE OPTIMIZATION FOR TRANSPORTATION ARRANGEMENT

TECHNICAL FIELD

The present disclosure relates to multi-objective optimization systems, and more specifically, to a customized multi-objective optimization framework for transportation arrangement.

BACKGROUND

Transportation optimization often meets the problem of tradeoff between several conflicting factors. Although there are a number of systems that can provide services for transportation arrangement, they do not facilitate flexible consideration of requirements from multiple objectives. Additionally, it is difficult for users to set their preferences for the optimization of a transportation problem.

Another challenge is evaluation of each objective since the comparison within an objective or between objectives is necessary with respect to each solution. For example, every vendor would like to reduce transportation cost of each order, however, customer's preference such as cargo safety and delivery promptness among other factors should also be taken into consideration. With consideration of such requirements, a short path for cargo transportation could save time cost or gasoline consumption. However, probability of cargo loss (e.g., fragile merchandises such as fruit, glass product) caused by bumpiness may increase. Another example is with respect to load capacity. In such case, fully loaded cargo can reduce unit transportation cost but this may also increase risk of loss due to extruding and collision.

The present disclosure relates to a multi-objective optimization system which may be customized according to user preferences, and particularly a multi-objective optimization system for transportation arrangement.

SUMMARY

A technology for multi-objective optimization is provided. In accordance with one aspect, historical data and real-time data of a network of interest are provided in an integrated database. User input containing a problem to be solved and user preference for solving the problem is received. An optimization function is identified for generating at least one solution to the problem. The optimization function is identified based on the user preference. In response to identifying a single objective optimization function, the optimization function is initiated from a single objective optimization function library. In response to identifying a multi-objective optimization function, the optimization function is initiated from a multi-objective optimization function library. The optimization function retrieves the historical and real-time data based on the user preference for solving the problem. A result comprising at least one solution to the problem is provided.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein.

DETAILED DESCRIPTION

Figure 1:
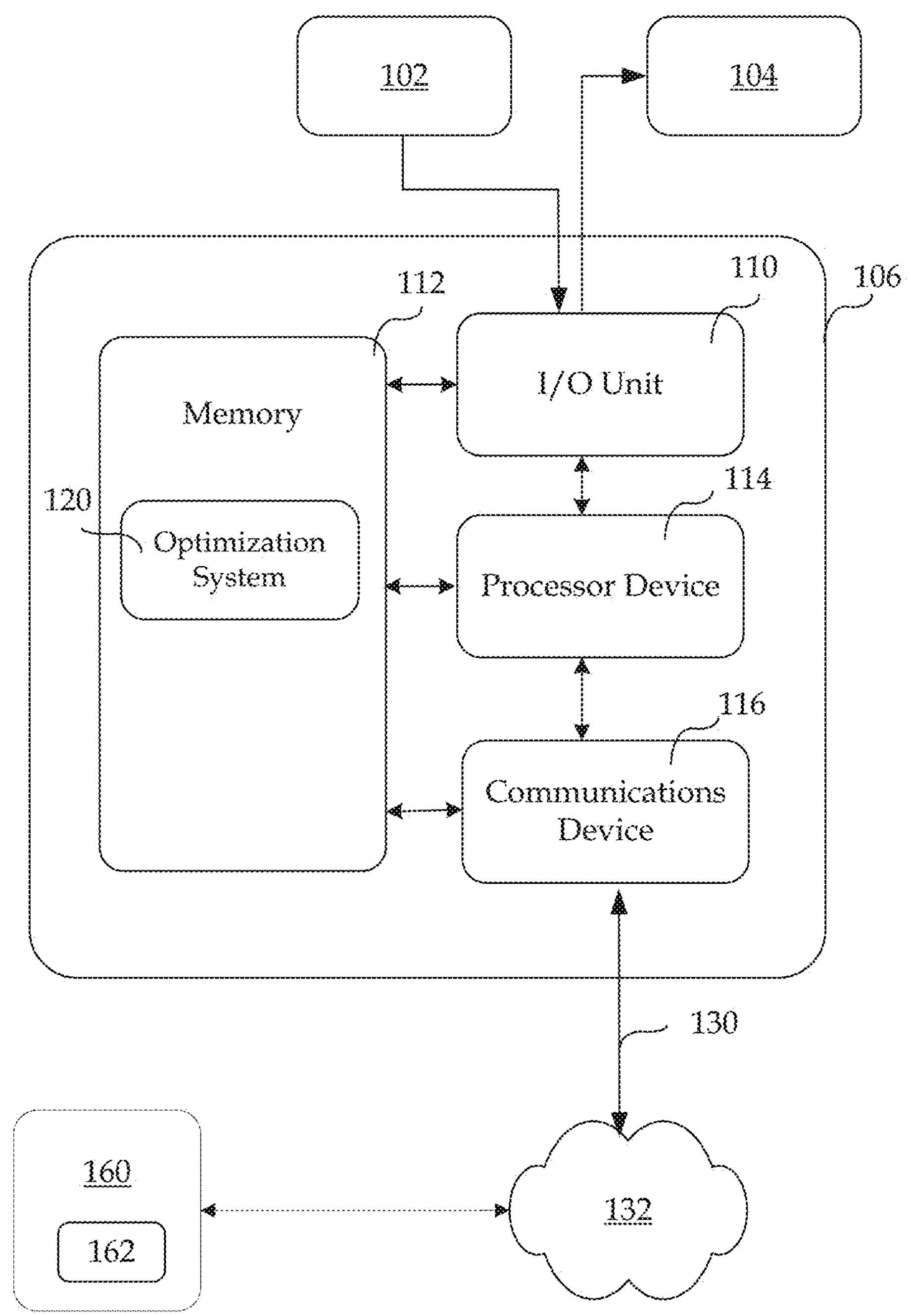
FIG. 1 is a block diagram illustrating an exemplary system.

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of the present framework and methods, and to thereby better explain the present framework and methods. Furthermore, for ease of understanding, certain method steps are delineated as separate steps; however, these separately delineated steps should not be construed as necessarily order dependent in their performance.

A framework for a customized and integrated optimization system is provided. In accordance with one aspect, the optimization system performs an optimization process based at least in part on user preference to generate one or more candidate solutions to a multi-objective problem. In some implementations, the optimization system uses historical and real-time information to evaluate solutions on each objective in the optimization process. The optimization system includes an integrated database storing the historical records and real-time information and an optimization engine with different types of optimization function libraries.

In one implementation, the optimization engine includes two different types of optimization function libraries for storing functions or algorithms that may be used in the optimization process. The first library contains methods or algorithms for solving a problem using single objective optimization. For example, single objective optimization functions such as Linear Programming, Mixed Integer Programming, and Dynamic Programming may be stored in the first library. The second type of library contains methods or algorithms for solving a problem using multi-objective optimization. For example, a problem may be solved using multi-objective optimization based on the Pareto front search technique (e.g., Skyline algorithm, Non-dominated Genetic Algorithm II (NSGA-II)). The optimization engine automatically determines the functions in the libraries to employ in the optimization based on user preferences.

A user may easily set his or her preference for solving the problem through a user interface. User preferences may include, for example, performance expectation, objectives to be evaluated and objective preference such as parameters for consideration with respect to each objective. Other types of user preferences may also be useful. The optimization engine advantageously allows for flexible configuration capability via the user interface. As the optimization is performed based on the user preferences, users may obtain results or solutions to a problem as desired. For example, the results may contain single or multiple solutions while solutions may be evaluated by weighting on factors. Further, the framework provides improved optimization methods to search optimal solutions efficiently. In some implementations, a genetic optimization function is employed.

The optimization system may be used to determine solutions to a problem such as, for example, a logistical problem in enterprise resource management or supply chain management. For example, a logistical problem may be for generating transportation arrangement for the shipment of goods, for instance, in a network involving multiple different locations. The network of locations, for example, may be within a particular geographical area of interest. The framework may be applied to optimize transportation operations by a service provider for shipping goods at the area of interest taking into consideration multiple objectives to be met in the transportation operations. The optimization system may generate one or more best routes and output the results as a transportation arrangement plan to the user.

For purposes of illustration, the present framework may be described in the context of generating one or more best solutions to a transportation arrangement problem taking into account multiple objectives. The present framework may also be applied for evaluating solutions to other problems using multi-objective optimization.

It should be appreciated that the framework described herein may be implemented as a method, a computer-controlled apparatus, a computer process, a computing system, or as an article of manufacture such as a computer-usable medium. These and various other features and advantages will be apparent from the following description.

FIG. 1 is a block diagram illustrating an exemplary system 100 in accordance with one aspect of the present framework. The system 100 includes a computer system 106 communicatively coupled to an input device 102 (e.g., keyboard, touchpad, microphone, camera, etc.) and an output device 104 (e.g., display device, monitor, printer, speaker, etc.). Computer system 106 may include a communications device 116 (e.g., a modem, wireless network adapter, etc.) for exchanging data with a network 132 using a communications link 130 (e.g., telephone line, wireless or wired network link, cable network link, etc.). The network may be a local area network (LAN) or a wide area network (WAN). The computer system 106 may be communicatively coupled to one or more client devices 160 via the network. For example, the computer system 106 may act as a server and operate in a networked environment using logical connections to one or more client devices 160.

Client devices 160 may include components similar to the computer system 106, and may be in the form of a mobile device, tablet computer, communication device, desktop computer, browser-based device, etc. A user at the client device 160 may interact with a user interface component 162 to communicate with the computer system 106. For example, the interface may be used to access various applications in the computer system 106.

Computer system 106 includes a processor device or central processing unit (CPU) 114, an input/output (I/O) unit 110, and a memory module 112. Other support circuits, such as a cache, a power supply, clock circuits and a communications bus, may also be included in computer system 106. In addition, any of the foregoing may be supplemented by, or incorporated in, application-specific integrated circuits. Examples of computer system 106 include a smart device (e.g., smart phone), a handheld device, a mobile device, a personal digital assistance (PDA), a workstation, a server, a portable laptop computer, another portable device, a mini-computer, a mainframe computer, a storage system, a dedicated digital appliance, a device, a component, other equipment, or some combination of these capable of responding to and executing instructions in a defined manner.

Memory module 112 may be any form of non-transitory computer-readable media, including, but not limited to, static random access memory (SRAM), Erasable Programmable Read-Only Memory (EPROM), Electrically Erasable Programmable Read-Only Memory (EEPROM), flash memory devices, magnetic disks, internal hard disks, removable disks, magneto-optical disks, Compact Disc Read-Only Memory (CD-ROM), any other volatile or non-volatile memory, or a combination thereof.

Memory module 112 serves to store machine-executable instructions, data, and various programs, such as an optimization system 120 for implementing the techniques described herein, all of which may be processed by processor device 114. As such, the computer system 106 is a general-purpose computer system that becomes a specific purpose computer system when executing the machine-executable instructions. Alternatively, the various techniques described herein may be implemented as part of a software product. Each computer program may be implemented in a high-level procedural or object-oriented programming language (e.g., C, C++, Java, etc.), or in assembly or machine language if desired. The language may be a compiled or interpreted language. The machine-executable instructions are not intended to be limited to any particular programming language and implementation thereof. It will be appreciated that a variety of programming languages and coding thereof may be used to implement the teachings of the disclosure contained herein.

It should be appreciated that the different components and sub-components of the computer system 106 may be located on different machines or systems. It should further be appreciated that the components of the client devices 160 may also be located on the computer system 106, or vice versa.

Figure 2:
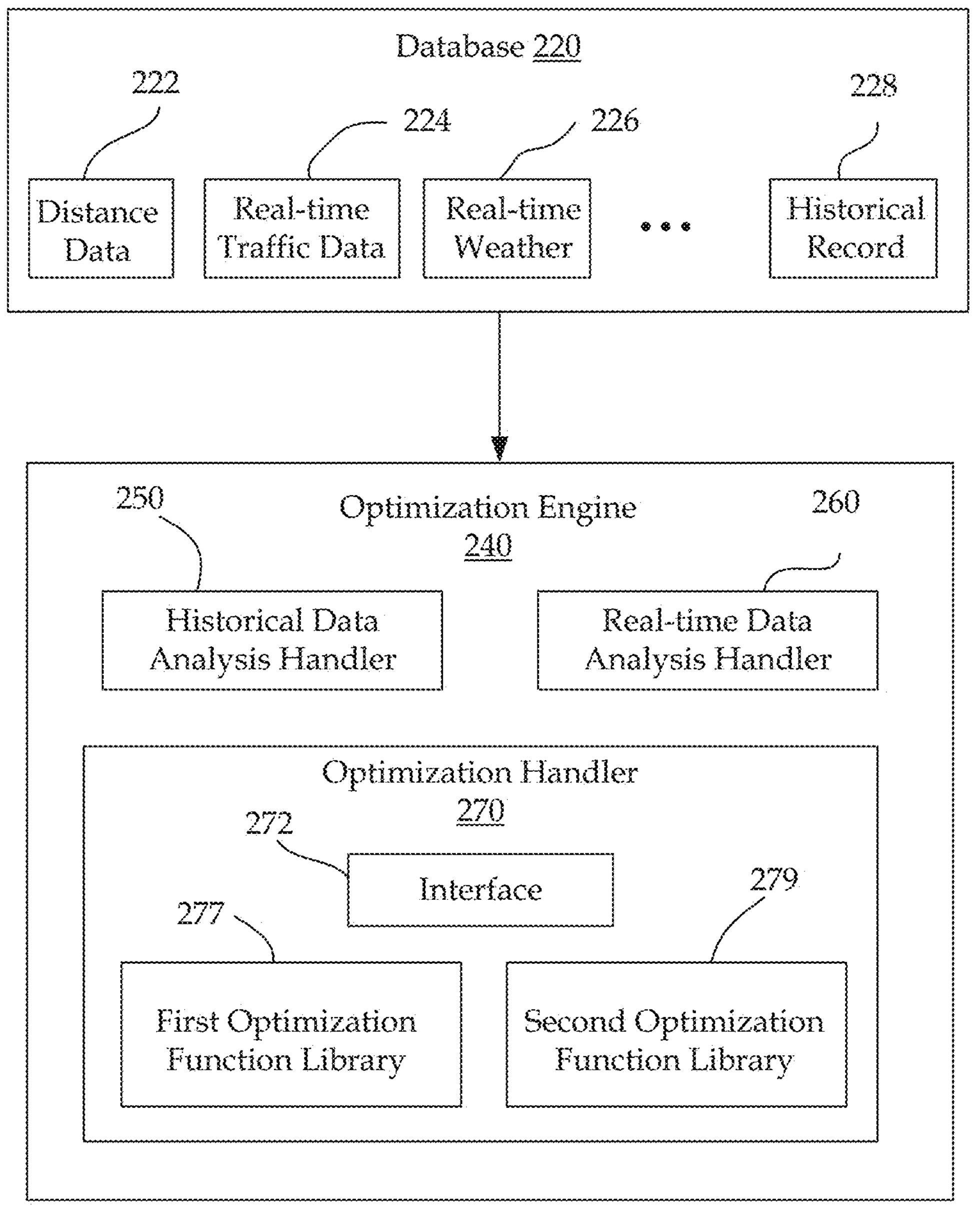
FIG. 2 shows an exemplary architecture of a multi-objective optimization system.

FIG. 2 shows an exemplary architecture of the optimization system 120 in greater detail. The optimization system 120 includes a database 220 and an optimization engine 240. Providing other modules for the optimization system may also be useful.

The database 220 may be integrated in the optimization system. In some implementations, the database 220 collects and stores historical records and real-time information for processing by the optimization engine 240. The database may be configured to retrieve and store data containing information which will be used for the optimization process. The type of data collected may be configured by a user. For example, the provider of the optimization system may configure the collection of data for storage in the database. The data retrieved and stored in the database may be configured depending on the type of problems which may be dealt with by the optimization system. Information required by the optimization functions in the libraries is stored in the database for retrieval during the optimization process. The integrated database allows for all the necessary information to be easily fetched and calculated for use by the optimization engine.

The database, for example, may be a relational database or Structured Query Language (SQL)-based database. In one implementation, the database is an in-memory database in the optimization system. For example, the database may be a SAP HANA database from SAP SE. Other types of databases may also be useful. In one implementation, the data contained in the database may be collected from external data sources. For example, historical records may be collected from online repositories. In other cases, data may be collected in real time, for example, from a service provider that manages traffic information. In other implementations, the data may be directly generated by other components of the optimization system and stored in the database. The data stored in the database may in the form of data structures such as tables and graphical representations. Providing other types of data may also be useful.

In the exemplary application of optimization in a transportation arrangement problem, the database may contain data such as inter alia, distance data 222, real-time traffic data 224, real-time weather 226, and historical records 228 which are used in the optimization process. In the case where a user would like to minimize transportation distance, a distance data of locations, for example, may be retrieved from the database to provide distance information between each pair of nodes in a network graph. If a user would like to minimize delivery time, real-time traffic data may be retrieved from the database to provide instant traffic condition for time cost evaluation. The historical records 228 may contain various historical data required for optimizing transportation arrangement. For example, the historical data may include transportation information such as a map, a network graph of the geographical area of interest, and gasoline consumption, road toll and cargo loss for previous shipments. Providing other types of data containing information required by the optimization may also useful.

Figure 3:
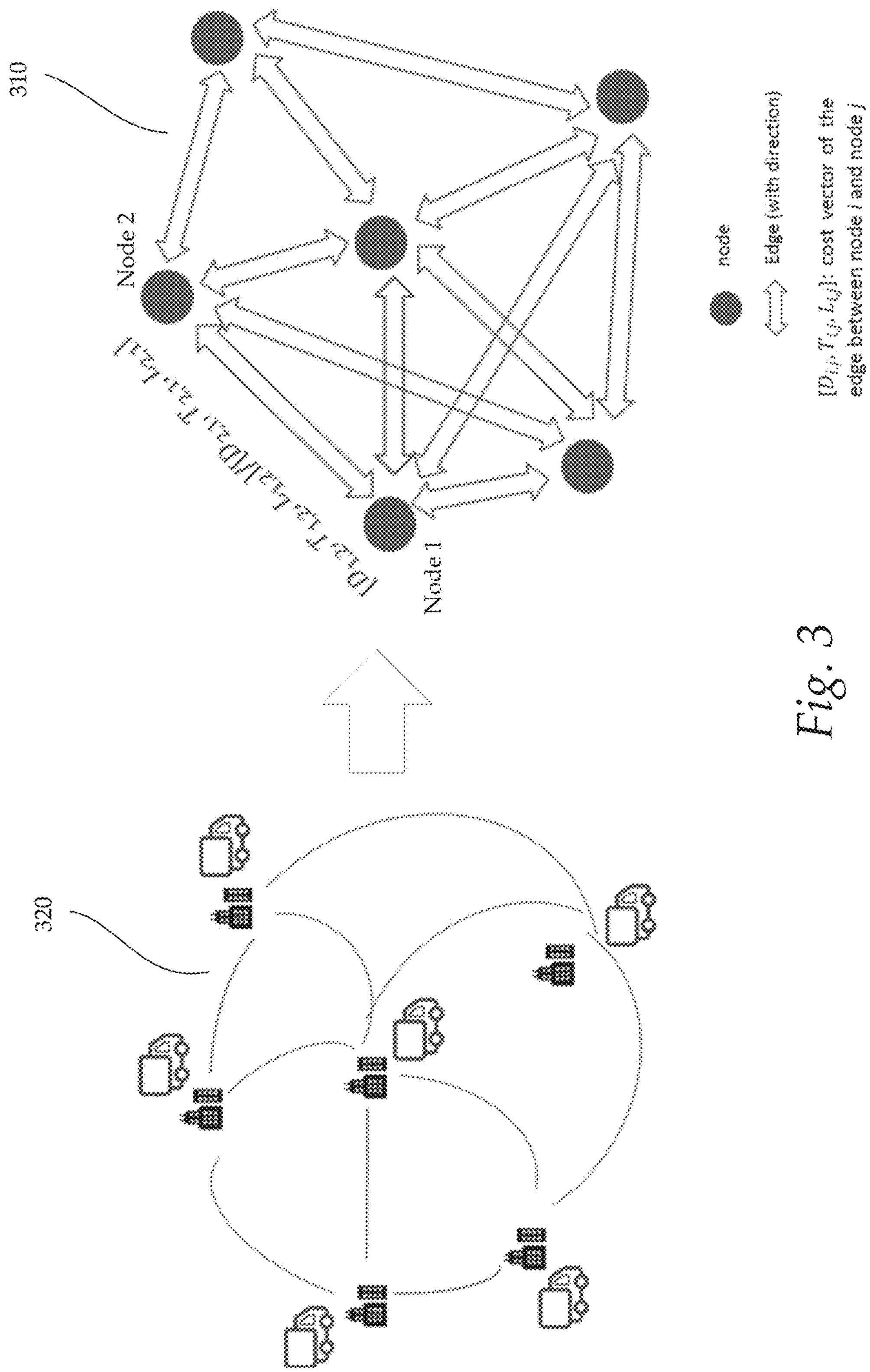
FIG. 3 illustrates an exemplary simplified network graph of a geographical area of interest.

FIG. 3 illustrates an exemplary simplified network graph 310 of a geographical area of interest. For example, the network graph 310 may be related to operations by a logistics service provider in the shipment of goods across a network 320 of different locations or destinations. The geographical area of interest, for example, may be of any scale. For example, the area of interest may encompass a metropolitan area, such as a city and its surrounding areas. Other sized areas of interest, such as, cities, towns, or countries, may also be useful.

As depicted, the network 320 involves shipment of goods across multiples sites in different locations or destinations in an area of interest. Each site may be connected to other sites via a combination of different routes or paths. For example, the routes may include connections of roads, land and sea as well as by air. Providing other types of routes may also be useful. The logistics service provider has various options of routes to take in delivering goods to all the different locations. The network graph 310 may be employed to graphically represent the network of locations and routes.

The network graph 310 may be stored and queried from the database. For example, the network graph may be predetermined and stored in the database. In one implementation, the network graph may be defined with nodes to represent the locations, and edges which interconnect the nodes. The routes may be represented by the connections between the nodes. The transportation arrangement problem of a particular geographical area, for example, may be represented as a directed graph G=(V, E), where V is a set of vertices (nodes) and E is a set of arcs (edges) with cardinality |V|=N and |E|=m. N represents the total number of nodes in the network graph and m represents the total number of connections between each pair of nodes. Each edge e connecting two neighboring nodes belonging to E is associated with a cost vector W. The cost vector of an edge may include, for example, distance cost, transportation cost, lost spoilage and consumption of resources. Providing other dimensions for the cost vector may also be useful. The cost vector between each pair of nodes may be derived from the data tables of historical and real-time transportation data in the database.

A route p is a sequence of vertices and arcs from a source or start node s to an end node t, and each edge connecting two nodes i and j is specified by a cost vector, $W_{i,j}=(D_{i,j}, T_{i,j}, L_{i,j})$. For example, the cost vector of an edge between nodes i and j includes dimensions such as minimal distance $D_{i,j}$, minimal cost $T_{i,j}$, and minimal loss spoilage $L_{i,j}$. Cost of a route p is represented as a vector, $W(p)=\Sigma_{i,j}W_{i,j}$ where W(p) is a sum of the cost vectors of all edges connecting intermediate nodes between a source node s to an end node t of route p. Providing other configurations of the network graph in the database may also be useful. Information associated in the network graph may be used to evaluate one or more best routes in the optimization process.

Table 1 illustrates exemplary attributes of distance data which is collected and stored in the database 220. The data table of distance data is sorted according to the attributes. For example, the distance data acquired from the database may be used by the optimization engine to determine the distance between any two nodes of the network graph.

TABLE 1

| Column Name | Description |
|---|---|
| Start Node | The unique name or identifier (ID) of a node in a map |
| End Node | The unique name or ID of a node in a map |
| Distance | Distance between the start and end nodes |

Table 2 illustrates exemplary attributes of real-time traffic data which is collected and stored in the database 220. For example, basic information such as node ID or name is provided with the traffic situation, which could be evaluated in many forms such as traffic flow speed, traffic time cost.

TABLE 2

| Column Name | Description |
|---|---|
| Start Node | The unique name or identifier (ID) of a node in a map |
| End Node | The unique name or ID of a node in a map |
| Traffic Flow | Average moving speed of traffic flow |

Table 3 illustrates exemplary attributes of historical transportation records which is collected and stored in the database 220. For example, detailed information of previous transportation parameters at a particular date or time is included in a data table in the database. For example, the transportation parameters may include, inter alia, toll expense, gasoline consumption, type of cargo and loss rate of cargo.

TABLE 3

| Column Name | Description |
|---|---|
| Timestamp | Record timestamp |
| Record ID | The unique ID of a transportation record |
| Start Node | The unique name or ID of a node in a map |
| End Node | The unique name or ID of a node in a map |
| Route ID | The unique ID of a route from one node to another |
| Unit Gasoline Consumption | Gasoline consumption per ton/kilogram/ . . . during the transportation |
| Road Toll | Road toll during the transportation |

TABLE 3-continued

| Column Name | Description |
|---|---|
| Cargo Type | Cargo type of the transportation (e.g., fruit, glass, produce, furniture) |
| Cargo Loss Rate | Loss rate caused by bumpiness or extruding |

Providing other historical transportation records with other transportation parameters may also be useful.

The optimization engine 240 retrieves the historical records and real-time information from the database 220. The optimization engine retrieves information based on the problem and user preference that is provided by the user. For example, in response to receiving user input, optimization engine 240 parses the user input and initiates the optimization process. Information which is required during the optimization process is retrieved from the database. In one implementation, the optimization engine 240 includes a historical data analysis handler 250, a real-time data analysis handler 260 and an optimization handler 270. Providing other components for the optimization system may also be useful.

The historical data analysis handler 250 may be used to analyze the retrieved historical data and generate useful patterns of parameters for evaluating the objectives in an optimization process. For example, the historical data analysis handler 250 may generate patterns for transportation parameters that are used to evaluate objectives in the optimization process for the transportation arrangement problem. The historical data analysis handler 250 may employ an aggregation query to the historical records to generate a table which provides useful pattern on a parameter.

For example, in the evaluation of gasoline consumption, in order to determine average unit gasoline consumption from Node A to Node B by all the possible or previous routes, a table may be created using the aggregation query. The average gasoline consumption of each existing route may be obtained based on the historical records. An exemplary aggregation query is shown as follows:

```
SELECT ROUTE_ID, AVG (UNIT_GASOLINE_CONSUMPTION)
AS AVG_CONSUMPTION
GROUPBY ROUTE_ID
WHERE START_NODE = "A" AND END_NODE = "B"
FROM HISTORICAL_DATA_TABLE
ORDERBY AVG_CONSUMPTION
```

Other information such as cargo loss rate with respect to different routes may also been generated.

A user may set a parameter as one of his or her interests in the optimization. For example, a user may set gasoline consumption as a parameter of interest in the optimization. This allows for more effective evaluation of an objective by the optimization handler 270. The user may set one or more parameters of interest by input via the user interface component 162.

As for the real-time data analysis handler 260, it uses real-time data to provide additional information for evaluating objectives. For example, in the case where there is a new route to be evaluated, or some route segments (e.g., from Node A to Node B) cannot evaluated through historical data analysis, the real-time data analysis handler may estimate the values by using real-time information. For example, using real-time traffic flow speed, the time cost may be estimated.

The optimization handler 270 serves to perform optimization processing for evaluating solutions on each objective. The optimization handler allows for customization of the optimization process by grouping all possible algorithms which may be used in the optimization process into separate libraries depending on the type of optimization. In one implementation, the optimization handler 270 includes an interface component 272, a first optimization function library 277 and a second optimization function library 279. Providing other components for the optimization handler may also be useful.

The interface component 272 includes an application programming interface (API) unit which is exposed to the client device 160 via the user interface component 162. For example, the API unit may be invoked by applications on the client device. Users may interact with the interface component via the applications to input the problem to be solved and the user preference. In one implementation, the interface component enables a user to input the problem to be solved and the user preference such as performance expectation, objectives to be evaluated, preference parameters for consideration with respect to each objective. For example, a user interface at the client device displays a number of options for the user to input the problem to be solved and the user preference.

In one implementation, performance expectation, objective and objective preference options are provided. The performance expectation option enables a user to indicate preference of one best solution or a group of non-dominated solutions which are all good but with tradeoff between each other. The objective option may include choices of selections that enable users to indicate objectives to be evaluated. For example, a list of objectives may be presented for user selection. Alternatively, the user may insert the objectives that he or she desires to be analyzed in the optimization process.

For example, in the transportation arrangement problem to generate one or more best solutions of candidate routes, multiple objectives may be provided for evaluation in the optimization process. Exemplary objectives may include 1) minimal distance, where there are a number of routes from start point s to end point t which may be selected as candidate routes and the route with minimal distance $D_{s,t}$ is preferred, 2) minimal cost, where expense of gasoline consumption and road toll for example are considered, the route with minimal expense $T_{s,t}$ is preferred, and 3) minimal loss spoilage, where damage and loss during transportation caused by bumpiness and extruding for example are considered, and minimal loss spoilage $L_{s,t}$ is preferred.

The objective preference option enables users to input preference parameters. The preference parameters enable weighting of each objective in the optimization process. The preference parameters, for example, may be user preferred parameters such as importance index of gasoline consumption, mode of travel (e.g., by land only), travel distance and road toll costs. Providing other types of preference parameters may also be useful. Weights of objectives are identical in the case where no such preference parameter is provided by the user. Providing other types of options for inputting user preference may also be useful.

In one implementation, the first optimization function library 277 and the second optimization function library 279 are different types of library. The first optimization function library 277 contains functions or algorithms that serve to perform single objective optimization. The single objective optimization is performed by combining all the objectives. In some implementations, the methods or algorithms in first optimization function library transforms all the objectives into one by weighting on the objectives. For example, the objectives are weighted in accordance with weights or preference parameters provided by the user for each objective. The invoked function in the library then solves the problem as a single objective optimization and generates the best solution to the problem.

The first optimization function library 277 includes conventional optimization algorithms such as linear programming and dynamic programming which may be used as candidate algorithms. In one implementation, two assumptions are used in the single objective optimization. First, the weight on each objective is obtained from the user. Next, prior knowledge is necessary to make various objectives comparable. For example, the price of transported merchandise should be known in order to determine the total expected loss (e.g., cash amount) when the loss rate is known from historical data analysis.

As for the second optimization function library 279, it is a multi-objective optimization function library. The library contains functions or algorithms which are suitable for performing multi-objective optimization. The second optimization function library evaluates all the objectives equally. Additionally, each objective does not dominate over the other objectives in the evaluation.

A number of algorithms suitable for multi-objective optimization may be placed in the second optimization function library as candidate algorithms to be used. For example, the second optimization function library may include algorithms such as Skyline algorithm, NSGA-II. Providing other types of algorithms suitable for multi-objective optimization may also be useful. For example, multi-objective optimization algorithm based on other genetic evaluations and operations may be employed in the second optimization function library. In some implementations, the algorithms in the second optimization function library may be performed in a parallel. Performing non-parallel optimization processing may also be useful.

The optimization handler parses the user input and determines the functions in the libraries to be invoked for the optimization process. The optimization handler initiates the optimization process using the functions in the first optimization function library or second optimization function library depending on the problem to be solved and the user preference provided by the user. According to the problem and users' preference, the most suitable optimization functions will be implemented.

In some implementations, rule based decision may be employed to determine the functions to be used for solving the problem provided by a user. Rule based decision may be employed based on the user preference. For example, rule based decision may be employed for solving the transportation arrangement problem. In the case where the user provides preference on each objective, the problem may be transformed into single objective and solved using a function in the first optimization function library. For example, single objective optimization is performed by the sum of each objective using the given weights. Alternatively, if the user inputs a selection of single objective optimization or selection of one best solution, a function in the first optimization function library may be selected if it is suitable for solving the problem.

In the case where a user would like to treat all the objectives equivalently, the functions in the second optimization function library may be utilized. For example, if the user provides input to evaluate all objectives identically or does not provide any objective preference, functions in the second optimization function library works by default.

Additionally, a function in the first optimization function library or the second optimization function library may be selected and initiated in response to the optimization handler determining it is suitable for solving the problem. The optimization handler may invoke one or more suitable functions available in the library depending on the transportation arrangement problem to be solved. For example, if the problem could be modeled in a linear way, linear programming will be invoked. If the problem is modeled into a mixed integer problem, mixed integer programming will be invoked. The algorithms may be invoked depending on the information provided by the user via the user interface for the problem to be solved. In some cases, default algorithms may be provided for a particular problem. For example, a default algorithm may be predetermined in the optimization engine for solving a particular transportation arrangement problem. Alternatively, the algorithm may be selected and assigned by the user.

Figure 4:
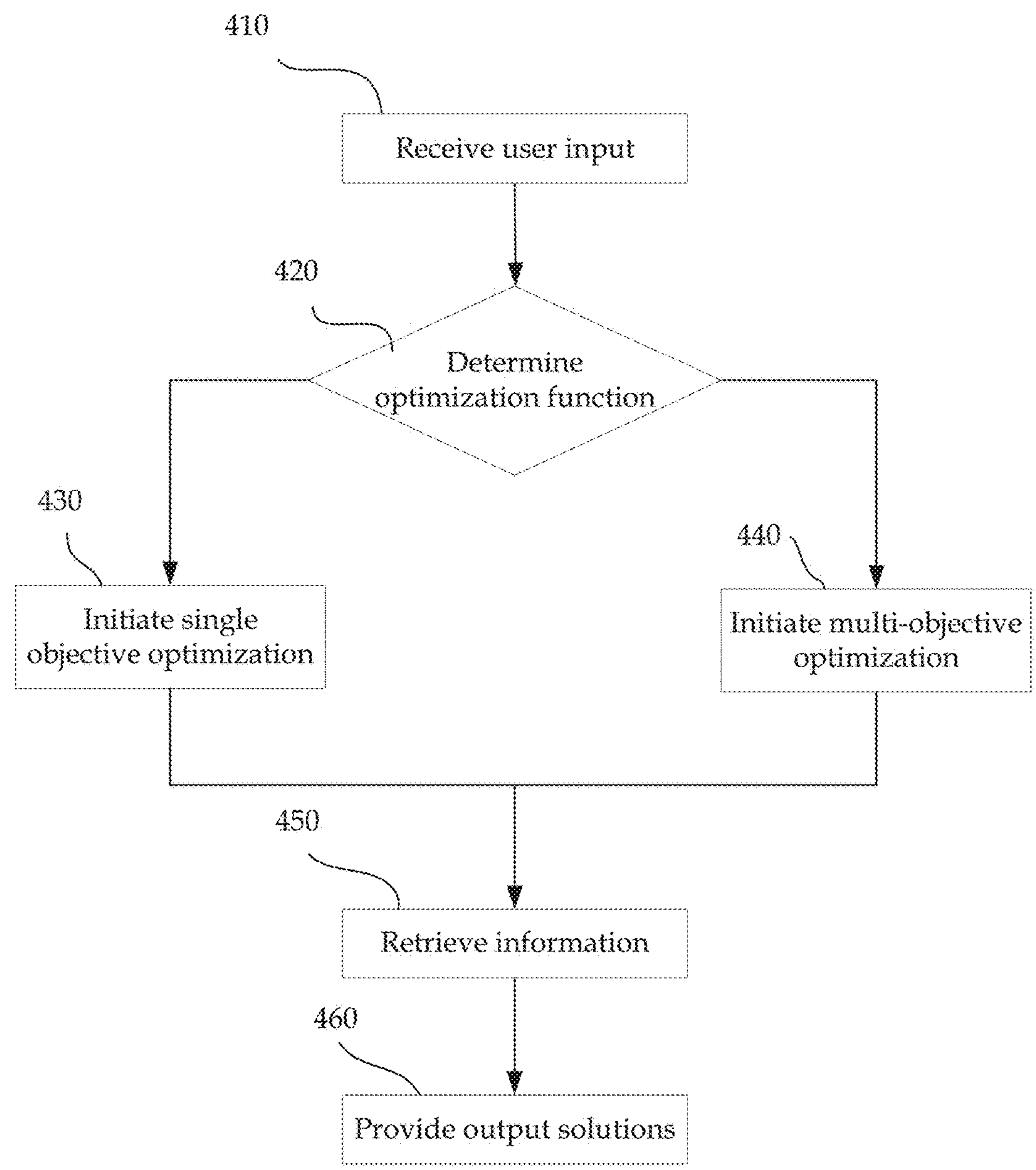
FIG. 4 illustrates an exemplary process for generating solutions to a transportation arrangement problem.

FIG. 4 illustrates an exemplary process 400 for generating solutions to a transportation arrangement problem. The process 400 may be performed automatically by the optimization system 120, as previously described with reference to FIGS. 1 and 2. It should be noted that in the following discussion, reference will be made, using like numerals, to the features described in FIGS. 1 and 2.

At 410, the optimization engine 240 receives user input via the user interface component 162 at the client device. The user input may include the problem to be solved and user preferences such as performance expectation, objectives to be evaluated and preference parameters for evaluating the objectives. Providing other information in the user input may also be useful. For example, the user input may include details of the problem to be solved.

In response to receiving the user input, at 420, the optimization engine parses the user input to determine the optimization function for solving the problem. The optimization engine identifies and determines the optimization function for solving the transportation arrangement problem based at least in part on the user preference. In the case where the optimization identifies a single objective optimization function for solving the problem, at 430, the optimization engine initiates the function in the first optimization function library to perform optimization of the problem. A single objective optimization function may be selected, for example, in the case where the user provides preference on each objective or if the user selects for one best solution.

In the case where the optimization engine selects a multi-objective optimization function for solving the problem, at 440, the optimization engine initiates the function in the second optimization function library to perform optimization of the problem. A multi-objective optimization function may be selected, for example, in the case where a user selects for equal preference of all the objectives. For example, if the user does not provide any objective preference, functions in the second optimization function library may be initiated depending on the problem.

At 450, the selected optimization function retrieves the relevant information which is required for solving the problem in the optimization process. In one implementation, the optimization function retrieves information from the integrated database 220 based on the user preference as well as problem criteria of the transportation arrangement problem which is to be solved. For example, based on the preference parameter provided by the user, the optimization function retrieves historical data such as the distance, routes, expense of gasoline consumption, road toll, and cargo loss rate, information in the network graph of the area of interest, and real-time data such as real-time traffic flow speed.

Additionally, information analyzed by the historical data analysis handler may also be collected for evaluation by the optimization function. The analyzed data provides useful pattern for evaluation in the optimization process. For example, the average gasoline consumption of each existing route may be obtained and include in the evaluation for one or more best routes. In some implementations, real-time information analyzed by the real-time data analysis handler may also be used for evaluation of candidate routes. For example, the time cost of a route estimated based on the real-time traffic flow speed may be obtained for the evaluation of candidate routes.

The selected optimization function outputs one or more best solutions of routes for the transportation arrangement problem. In the case where a single objective optimization function is employed for the optimization process, one best solution may be provided. In the case where the optimization engine selects a multi-objective optimization function for the optimization, multiple best solutions of routes which do not dominate each other is provided to the user. At 460, the optimization engine provides the best solutions to the user via the user interface of the user interface component 162.

Figure 5:
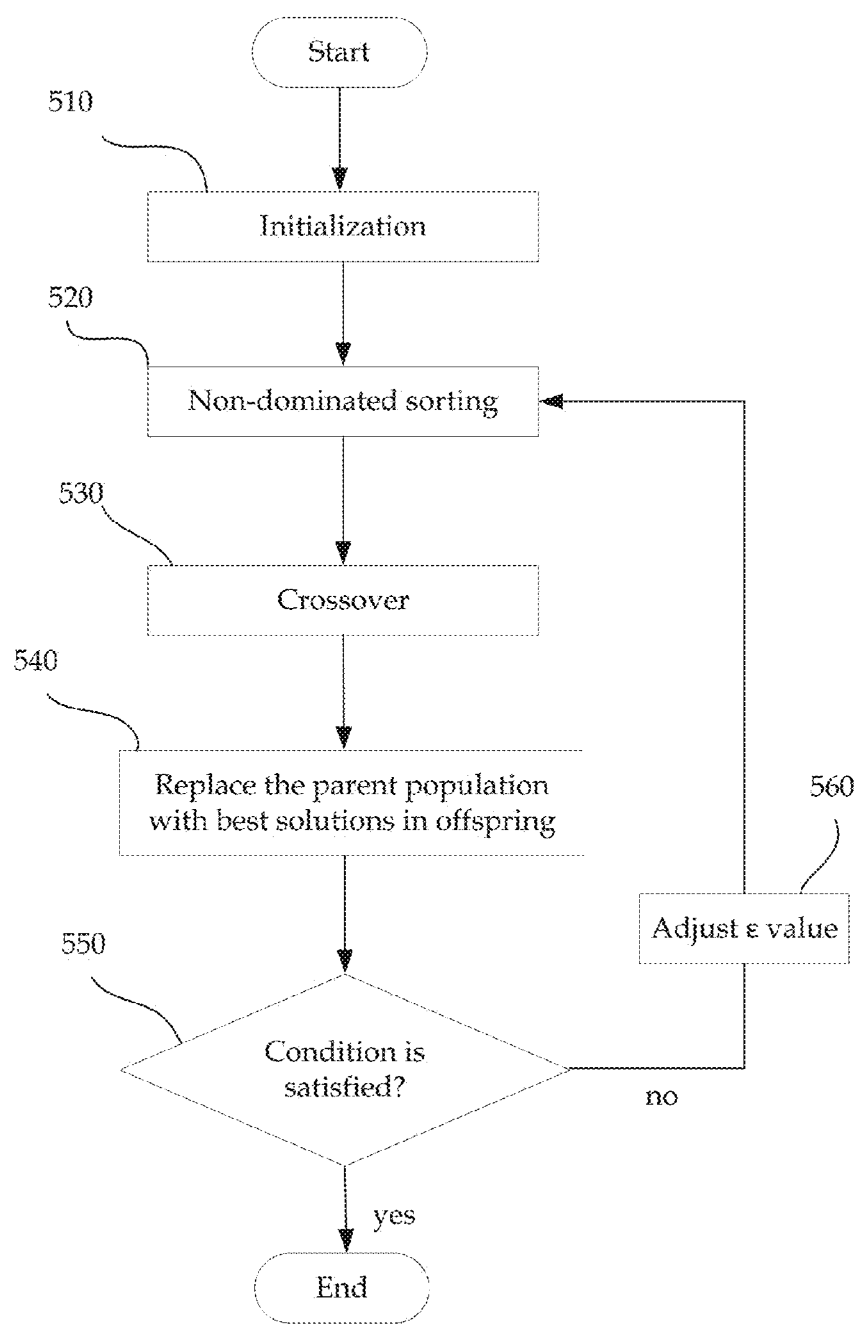
FIG. 5 illustrates an exemplary optimization process for the transportation arrangement problem.

FIG. 5 illustrates an exemplary optimization process 500 of a genetic optimization function for the transportation arrangement problem. In one implementation, the genetic optimization function uses ε-dominance for updating solutions in the optimization process. The genetic function uses both ε-dominate and ε-dominated area of child solutions for updating. The genetic function may be a multi-objective optimization algorithm placed in the second optimization function library. The genetic function may be invoked by the optimization handler. For example, the optimization handler may invoke the genetic function when genetic-based algorithms (e.g., NSGA-II) are to be employed.

Genetic representation and operators may be defined for the genetic function. For example, chromosomal representations, crossover operator and replace and update operator may be defined. Using other representations and operators may also be useful. In some implementations, chromosomes with variable length are applied. Each chromosome is encoded with a candidate route in its data structure. For example, the chromosome may be encoded with a route between a start node s and an end node t in its data structure, using the nodes as described in the network graph. In addition to representing the node identifier (ID) of a location which a route passes, the chromosome also contains information of other nodes representing other locations which are connected to that location in the route.

Referring to FIG. 5, at 510, the genetic function may perform an initialization to generate the chromosomes randomly. A route or a chromosome may be initially generated randomly in an ordered sequence from a source node s to an end node t. The ID of the source node s is assigned to the first locus of the chromosome. The ID of a randomly generated node is assigned to the second locus such that the generated node is associated to a set of nodes connected to the source node s. The procedure is performed iteratively for the succeeding nodes until a simple route to the end node t is created. The initialization produces a parent population of the first generation chromosomes randomly. For example, the parent population of the first generation chromosomes represents the first generation of candidate solutions of routes for the transportation arrangement problem.

At 520, non-dominated sorting is applied to sort the parent population of chromosomes into several non-dominated layers L. Evaluations are performed for each of the candidate solutions of routes based at least in part on the user preference. The non-dominated sorting uses information retrieved from the integrated database based on the user preference as well as criteria of the transportation arrangement problem which is to be solved. The function retrieves data of various input parameters from the database. The parameters include, for example, gasoline consumption, road toll and cargo loss rate, cost vectors of the network graph. Retrieving other input parameters for evaluation may also be useful. For example, the sorting evaluates the distance, expense of gasoline consumption and road toll, and loss spoilage for each of the candidate solutions of routes. Using other costs or parameters for the evaluation may also be useful. The non-dominated sorting finds the same good solutions of routes or solution front that does not dominate each other.

At 530, a crossover operation is performed on the parent chromosomes to generate a next generation of solutions of the routes. The crossover operation is analogous to biological reproduction and crossover. For example, the crossover operation is a process of taking more than one parent solutions and producing a child solution. For example, the crossover operator may be used to crossover two routes represented by a pair of chromosome. The crossover operator, in one implementation, generates a new route by creating a branch between two parent routes. A branch, for example, may be one or more arcs which connect to nodes of route but are not included in the route. The two parent routes could be crossover without the constraint of common nodes. Additionally, a branch between the two parent routes may be used for recombination of the routes to generate new routes. The branch may be included in the generated routes. A common node or common branch is first identified before selection of parts from two parent routes for the recombination. The child solution may be generated by selecting a first part in a route of a first parent chromosome and another part in a route of a second parent chromosome. The crossover operator enables the recombination to be flexible as the recombination is possible even if there is only a branch connecting the two parent routes and the branch is not required in each of the two parent routes. Two parent chromosomes are randomly recombined to generate offspring representing child solutions or new routes. The child solutions may be generated one by one during recombination of chromosomes pairs in the parent population.

At 540, the genetic function replaces the parent population with best solutions from the offspring. The replace and update operator is used replace parent solutions with better and unique child solutions. An elitist selection scheme, for example, may be employed. The replace and update operator first identifies the best layer $L_{Best}$ in which a child solution is not dominated. Next, ε-dominance is applied to check uniqueness of the child solution in both the best layer $L_{Best}$ and the next best layer $L_{Best-1}$. Rules may be employed to determine whether the child solution may be accepted to replace a parent solution in the best layer. Solutions are then re-sorted according to their dominance relationship when a new solution is updated. The solution may be re-sorted by non-dominated sorting.

At 550, the process determines if the condition that is being evaluated is satisfied. In one implementation, the process determines if the max iteration number is achieved. The condition may be pre-configured by the user. For example, the condition may be a predefined number value.

Providing other conditions may also be useful. If the condition is not satisfied, the value of the parameter epsilon ε is adjusted at 560. The process adapts the value of the epsilon ε to control speed of convergence and ability of exploitation in the population. In most cases, the parameter ε should have a big value to exploit the objective space widely at the beginning stage. It subsequently becomes smaller with the increasing number of rejected new solutions. The parameter ε advantageously enhances exploration capability.

The process then returns to step 520 to perform non-dominated sorting and repeats the steps for generating child solutions and selecting the best solution from the population. If the condition is satisfied, the process terminates for the condition being evaluated and output the best solutions of routes.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A multi-objective optimization system, comprising:

a non-transitory memory device for storing computer-readable program code; and a processor in communication with the memory device, the processor being operative with the computer-readable program code to:

provide, by an integrated database, historical data and real-time data of a network of interest, the real-time data comprising real-time traffic data, the real-time traffic data comprising a flow speed associated with a route;

receive, via an API call invoked by an application associated with a client device, user input comprising a transportation arrangement problem to be solved and user preference for solving the problem, the user preference having been received via a user interface of the application and comprising multiple objectives and performance parameters for weighting the objectives;

identify an optimization function for generating at least one solution to the problem, wherein the optimization function is identified based on the user preference;

in response to identifying a single objective optimization function, initiate the optimization function from a single objective optimization function library in the optimization system;

in response to identifying a multi-objective optimization function, initiate the optimization function from a multi-objective optimization function library in the optimization system;

the optimization function retrieves the historical and real-time data based on the user preference for solving the problem and generates one or more best routes for the transportation arrangement problem, wherein retrieving the historical data comprises generating an aggregation query corresponding to the optimization function and executing the aggregation query on the historical data of the integrated database, and providing results comprising the at least one solution to the problem.

2. The system of claim 1 wherein the single objective optimization function library comprises a Linear Programming function, a Mixed Integer Programming function, a Dynamic Programming function or a combination thereof.

3. The system of claim 2 wherein the multi-objective optimization function library comprises a Skyline algorithm, a non-dominated Genetic Algorithm II, or a combination thereof.

4. The system of claim 1 wherein the optimization function is a genetic function that uses ε-dominance in the optimization process for updating solutions to generate multiple solutions of best routes.

5. The system of claim 4 wherein the genetic function performs a crossover operation to generate new routes for evaluation and replace existing routes in response to determining that the new routes dominate the existing routes.

6. The system of claim 1 further comprising providing, by the database, a network graph of an area of interest for the transportation arrangement problem, wherein the network graph comprises nodes representing destinations of interest, and edges connecting the nodes, wherein the edges are associated with cost vectors.

7. The system of claim 6 wherein the cost vectors comprises minimal distance, minimal cost, minimal lost spoilage or a combination thereof.

8. A computer-implemented method of multi-objective optimization for transportation arrangement, comprising:

providing, by a database, historical data and real-time data of a geographical area of interest, the real-time data comprising real-time traffic data, the real-time traffic data comprising a flow speed associated with a route;

receiving, via an API call invoked by an application associated with a client device, user input comprising a transportation arrangement problem to be solved and user preference for solving the problem, the user preference having been received via a user interface of the application and comprising preference parameters for weighting multiple objectives of the transportation arrangement problem;

identifying an optimization function for generating at least one solution to the problem, wherein the optimization function is determined based on the user preference;

in response to identifying the optimization function, initiating the optimization function from one of a first optimization function library and a second optimization function library, wherein the first and second optimization function libraries are different types of optimization function libraries in an optimization system;

the optimization function retrieves the historical and real-time data based on the user preference for solving the transportation arrangement problem, wherein retrieving the historical data comprises generating an aggregation query corresponding to the optimization function and executing the aggregation query on the historical data in the database; and providing results comprising the at least one solution of best routes.

9. The method of claim 8 wherein the first optimization function library is a single objective optimization function library comprising functions for performing single objective optimization.

10. The method of claim 9 wherein the first optimization function library comprises a Skyline algorithm, a non-dominated Genetic Algorithm II, or a combination thereof.

11. The method of claim 8 wherein the second optimization function library is a multi-objective optimization function library comprising functions for performing multi-objective optimization.

12. The method of claim 11 wherein the second optimization function library comprises a Skyline algorithm, a non-dominated Genetic Algorithm II, or a combination thereof.

13. The method of claim 12 wherein the optimization function is a genetic function that uses ε-dominance in the optimization process for updating solutions to generate multiple solutions of best routes.

14. A non-transitory computer readable medium embodying a program of instructions executable by machine to perform steps comprising:

providing historical data and real-time data of a geographical area of interest, the real-time data comprising real-time traffic data, the real-time traffic data comprising a flow speed associated with a route;

receiving, via an API call invoked by an application associated with a client device, user input comprising a problem to be solved and user preference for solving the problem, the user preference having been received via a user interface of the application and comprising preference parameters for weighting multiple objectives of the problem;

identifying an optimization function for generating at least one solution to the problem, wherein the optimization function is determined based on the user preference;

in response to identifying the optimization function, initiating the optimization function from one of a first optimization function library and a second optimization function library, wherein the first and second optimization function libraries are different types of optimization function libraries in an optimization system;

the optimization function retrieves the historical and real-time data based on the user preference for solving the problem, wherein retrieving the historical data comprises generating an aggregation query corresponding to the optimization function and executing the aggregation query on the historical data; and providing results comprising the at least one solution.

15. The non-transitory computer readable medium of claim 14 wherein the first optimization function library is a single objective optimization function library comprising functions for performing single objective optimization.

16. The non-transitory computer readable medium of claim 15 wherein the second optimization function library is a multi-objective optimization function library comprising functions for performing multi-objective optimization.

* * * * *